United States Patent
West

(10) Patent No.: US 7,463,500 B2
(45) Date of Patent: Dec. 9, 2008

(54) MONOPOLAR DC TO BIPOLAR DC TO AC CONVERTER

(75) Inventor: Rick West, Pismo Beach, CA (US)

(73) Assignee: Xantrex Technology, Inc., Arlington, WA (US)

( * ) Notice: Subject to any disclaimer, the term of this patent is extended or adjusted under 35 U.S.C. 154(b) by 297 days.

(21) Appl. No.: 11/306,580

(22) Filed: Jan. 3, 2006

(65) Prior Publication Data

US 2008/0037305 A1 Feb. 14, 2008

Related U.S. Application Data

(63) Continuation-in-part of application No. 10/248,826, filed on Feb. 21, 2003, now Pat. No. 7,064,969.

(51) Int. Cl.
| | |
|---|---|
| H02J 1/00 | (2006.01) |
| H02J 1/10 | (2006.01) |
| H02J 1/12 | (2006.01) |
| H02J 3/00 | (2006.01) |
| H02J 5/00 | (2006.01) |
| H02J 3/32 | (2006.01) |
| H02J 3/34 | (2006.01) |
| H02J 7/34 | (2006.01) |
| H02J 7/00 | (2006.01) |
| H02J 9/00 | (2006.01) |
| H02M 3/00 | (2006.01) |
| H02M 3/335 | (2006.01) |
| H02M 5/45 | (2006.01) |
| H02M 5/458 | (2006.01) |
| H02M 7/48 | (2007.01) |
| H02M 7/537 | (2006.01) |
| H02M 7/5387 | (2007.01) |
| H02M 7/538 | (2007.01) |
| G05F 1/12 | (2006.01) |
| G05F 1/46 | (2006.01) |
| G05F 1/24 | (2006.01) |
| G05F 1/00 | (2006.01) |
| H03K 19/00 | (2006.01) |

(52) U.S. Cl. ............................ 363/132; 363/15; 363/17; 363/21.12; 363/37; 363/65; 363/71; 363/131; 363/132; 363/133; 323/247; 323/259; 323/268; 307/45; 307/46; 307/48; 307/66; 307/71; 307/82

(58) Field of Classification Search .............. 363/56.01, 363/56.02, 95, 97, 98, 131, 132, 15, 17, 21.12, 363/37, 65, 71, 133; 307/45, 46, 48, 66, 307/71, 82; 323/247, 259, 268

See application file for complete search history.

(56) References Cited

U.S. PATENT DOCUMENTS 3,737,755 A 6/1973 Calkin et al.

(Continued)

*Primary Examiner*—Akm Enayet Ullah
*Assistant Examiner*—Johali A Torres Ruiz
(74) *Attorney, Agent, or Firm*—Thelen LLP

(57) ABSTRACT

An electrical DC-to-AC power conversion apparatus is disclosed that is primarily intended for use with solar photovoltaic sources in electric utility grid-interactive applications. The invention improves the conversion efficiency and lowers the cost of DC-to-AC inverters. The enabling technology is a novel inverter circuit topology, where throughput power, from DC source to AC utility, is processed a maximum of 1½ times instead of 2 times as in prior-art inverters. The AC inverter output configuration can be either single-phase, split-phase or poly-phase.

6 Claims, 7 Drawing Sheets

U.S. PATENT DOCUMENTS

| | | | |
|---|---|---|---|
| 5,559,685 A * | 9/1996 | Lauw et al. ................... 363/37 |
| 6,232,742 B1 | 5/2001 | Wacknov et al. |
| 6,320,769 B2 | 11/2001 | Kurokami et al. |
| 6,469,919 B1 | 10/2002 | Bennett |
| 6,587,051 B2 | 7/2003 | Takehara et al. |
| 6,678,174 B2 | 1/2004 | Suzui et al. |
| 7,064,969 B2 * | 6/2006 | West .......................... 363/132 |
| 7,138,730 B2 * | 11/2006 | Lai ............................. 307/82 |
| 2002/0034083 A1 * | 3/2002 | Ayyanar et al. ............... 363/17 |

* cited by examiner

MONOPOLAR DC TO BIPOLAR DC TO AC CONVERTER

CROSS-REFERENCE TO RELATED APPLICATIONS

This application is a continuation-in-part of U.S. patent application Ser. No. 10/248,826, entitled "Monopolar DC to Biopolar to AC Converter," filed on Feb. 21, 2003, which issued as U.S. Pat. No. 7,064,969 on Jun. 20, 2006.

BACKGROUND OF INVENTION

The invention is an electrical power conversion topology and apparatus for converting and delivering power from a mono-polar DC source to an AC load.

Photovoltaic (PV) cells produce power over a wide voltage range depending on the amount of sunlight and the temperature of the photovoltaic cell. There are National Electric Code and class-of-equipment restrictions that make PV arrays much more cost effective when sized for a maximum of 600 Vdc. In order to source AC power into the electric utility grid, over the expected range of DC voltages, prior art utility-interactive inverters use two power conversion stages.

FIG. 6 shows one common prior art inverter topology. Photovoltaic (PV) array 10 is connected to the inverter at input terminals 11 and 12 across energy storage capacitor 59. Transistors 51, 52, 55 and 56 are connected in a typical full-bridge arrangement. For clarity, anti-parallel diodes across each transistor are not shown. The full bridge is driven by a control circuit to regulate sinusoidal current in phase with the electric utility voltage across output terminals 71 and 72. Current sensor 54 provides feedback to the control circuit. Inductor 53 smoothes the high frequency, pulse width modulated (PWM) waveform created by the switching action of transistors 51, 52, 55 and 56. Transformer 60 steps down the utility voltage at terminals 71 and 72 to present a lower voltage to DC-to-AC converter 50 so that power can be delivered from PV array 10 to electric utility grid 70 under all conditions of temperature and irradiation on PV array 10. Electric utility grid 70 is shown as typical, residential, 120/240 Vac, split-phase configuration with a center earth ground. PV array 10 can be operated grounded or ungrounded.

The inverter topology illustrated in FIG. 6 has a number of limitations. First, all of the power from PV array 10 to electric utility grid 70 must be processed twice, once by DC-to-DC converter 50 and once by transformer 60. Transformer 60, from a loss-inventory perspective, is considered an AC-to-AC converter stage. Power is lost in each of these power conversion stages with a negative impact on overall inverter conversion efficiency. Second, transformer 60 operates at the electric utility line frequency and as such is heavy and expensive.

FIG. 7 shows another prior art inverter topology. Photovoltaic (PV) array 10 is connected to the inverter at input terminals 11 and 12. Energy storage capacitor 81, inductor 82, current sensor 83, transistor 84 and diode 85 are arranged as a typical, non-isolated, voltage boost converter. Capacitor 41 is shared by DC-to-DC converter 80 and DC-to-AC converter 50. Transistors 51, 52, 55 and 56 are connected in a typical full-bridge arrangement. For clarity, anti-parallel diodes across each transistor are not shown. The full bridge is driven by a control circuit to regulate sinusoidal current in phase with the electric utility voltage across output terminals 71 and 72. Current sensor 54 provides feedback to the control circuit. Inductors 53 and 57 smooth the high frequency, pulse width modulated (PWM) waveform created by the switching action of transistors 51, 52, 55 and 56. Electric utility grid 70 is shown as typical, residential, 120/240 Vac, split-phase configuration with a center earth ground. PV array 10 must be operated ungrounded.

The inverter topology illustrated in FIG. 7 has a number of limitations. Again, all of the power from PV array 10 to electric utility grid 70 must be processed twice, once by DC-to-DC converter 80 and once by DC-to-AC converter 50. Power is lost in each of these power conversion stages with a negative impact on overall inverter conversion efficiency. Second, when the inverter is operating, there will be large AC common mode voltages, at the utility grid frequency and at the PWM switching frequency, on PV array 10 with respect to earth. The array becomes a radio transmitter. Also, additional conversion losses are had by charging and discharging the parasitic PV-array-to-earth-ground capacitance. In most U.S. jurisdictions, this inverter topology must be used with an external isolation transformer to meet regulatory code requirements.

Other prior-art inverter use a high frequency, double conversion topology which uses a high-frequency, transformer isolated DC-to-DC, voltage boosting converter first stage and a full-bridge DC-to-AC second stage. This topology significantly reduces the inverter weight and cost, a problem with the FIG. 6 topology and mitigates the problem of AC common mode voltage on the PV array, a problem with the FIG. 7 topology. This approach, however, yields the lowest conversion efficiencies because there are too many semiconductor losses. In terms of this discussion, the DC-to-DC stage used in these topologies is, more precisely, a DC-to-High Frequency AC-to-DC converter. Designs based on these topologies are complex, have high component parts counts and, as such, are less robust.

In all prior art topologies discussed, 100% of the throughput power is processed twice and power is lost in each conversion stage. The invention is an improvement over the prior art because the DC-to-AC conversion for the entire PV power converter can be done with 1½ conversion steps, instead of 2, for systems with grounded PV arrays and with effectively less than 1½ conversion steps for systems with ungrounded PV arrays. This translates to at least 25% less complexity, cost and conversion losses over the prior art.

DETAILED DESCRIPTION OF THE INVENTION

A number of slightly different DC-to-AC inverter topologies will be disclosed, all with the common characteristic that less than 1½ conversion stages are used or, stated differently, that at least ½ of the power from a DC source is converted only once in the DC-to-AC conversion process. The topologies are variations of the central idea of the invention configured to facilitate different options for the PV array grounding and the utility grid configuration.

Figure 1:
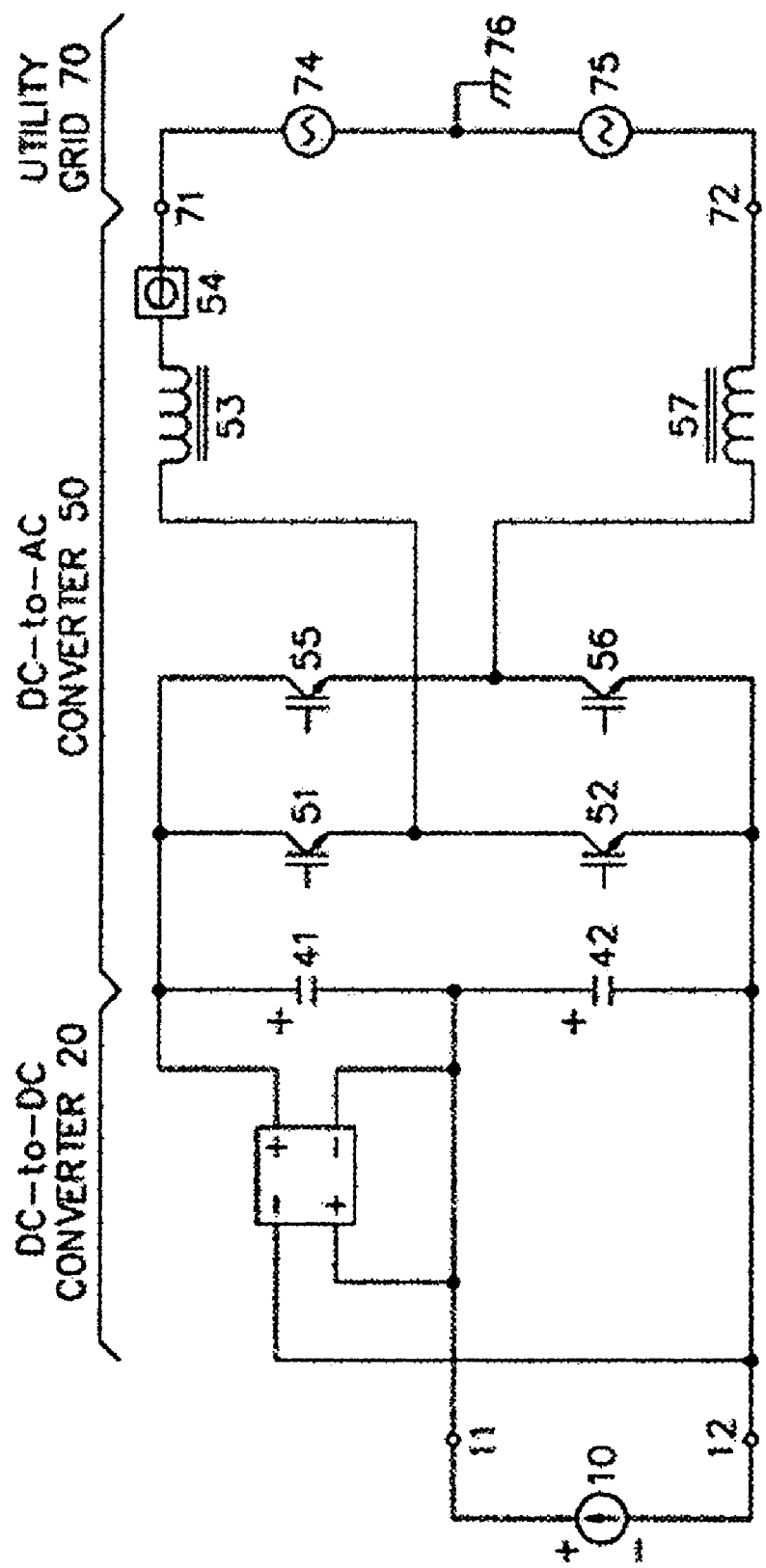
FIG. 1 illustrates the preferred embodiment of the invention in a system with an ungrounded PV array and a 120/240 Vac utility grid connection.

The preferred embodiment of the invention is shown in FIG. 1. PV array 10 is connected to inverter input terminals 11 and 12, across energy storage capacitor 42 and across the input of DC-to-DC converter 20. The output of DC-to-DC converter 20 is connected to energy storage capacitor 41. Capacitors 41 and 42 comprise the "bipolar energy storage element" referred to in the claims. Transistors 51, 52, 55 and 56 are connected in a typical full-bridge arrangement. For clarity, anti-parallel diodes across each transistor are not shown. The full bridge is driven by a control circuit to regulate sinusoidal current in phase with the electric utility voltage across output terminals 71 and 72. Current sensor 54 provides feedback to a control circuit. Inductor 53 and 57 smooth the high frequency, pulse width modulated (PWM) waveform created by the switching action of transistors 51, 52, 55 and 56. A 60 Hz sinusoidal current is sourced into utility grid lines 74 and 75. This regulation methodology is known and is not part of this disclosure. Utility grid configuration 70 is a typical, residential, split-phase, 120/240 Vac service with earth-grounded center-tap 76. PV array 10 and DC-to-DC converter 20 have no earth-ground reference. As such the voltage "seen" by DC-to-AC converter 50 is the voltage across the series combination of energy storage capacitors 41 and 42. The voltage across capacitor 42 is always greater than the voltage across capacitor 41. For example for a PV system designed to work at ambient temperatures of between 0° F. (−18° C.) and 115° F. (46° C.), PV array 10 voltage across capacitor 42 would be 443 Vdc and 326 Vdc respectively. The minimum required voltage across both capacitors required for DC-to-AC converter 50 to source undistorted current into a nominal 120/240 Vac utility grid is about 380 Vdc. Therefore, on the coldest day all of the throughput power, from PV array 10 to utility grid 70 is processed in a single, very high efficiency power conversion by DC-to-AC converter 50 alone and DC-to-DC converter 20 does not operate. On the hottest day DC-to-DC converter 20 regulates 54 Vdc (380 Vdc minus 326 Vdc) across capacitor 41. On the hottest day, 14% of the power is processed twice, once by DC-to-DC converter 20 and a second time by DC-to-AC converter 50. The other 86% of the power is processed by DC-to-AC converter 50 alone. The "makeup" voltage supplied by and regulated by DC-to-DC converter 20 will be a function of the PV array voltage and the utility grid voltage. Higher AC utility grid voltages will require more of a contribution from DC-to-DC converter 20. The voltage across PV array 10 will be regulated by an iterative perturb-and-observe algorithm to track the maximum power point of PV array 10 under all conditions. These regulation and control methodologies are known. The invention is a novel power conversion topology using known control and regulation methods.

Figure 2:
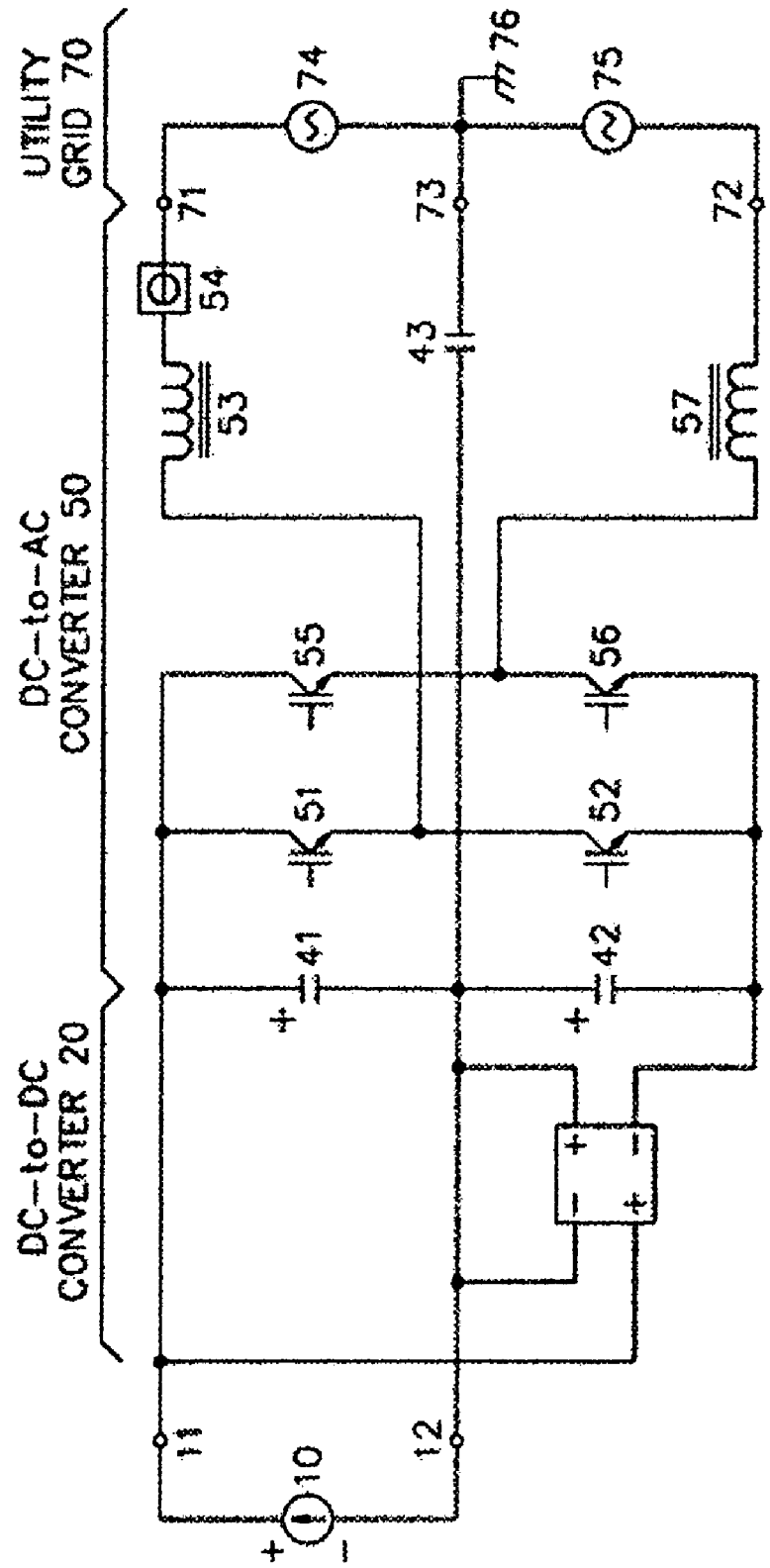
FIG. 2 illustrates a second embodiment where the PV array and DC-to-DC converter connections are swapped in a system with an ungrounded PV array and a 120/240 Vac utility grid connection.

FIG. 2 illustrates a variant of the topology disclosed in FIG. 1. There are two differences. First, the location of PV array 10 and DC-to-DC converter 20 are exchanged. Second, capacitor 43 has been added. These two differences have no effect on the inverter performance or function described in FIG. 1. With the inclusion of capacitor 43, an AC ground reference is established for PV array 10 and the bipolar energy storage element formed by capacitors 41 and 42. In some inverter designs the addition of capacitor 43 will reduce electromagnetic radiation.

Figure 3:
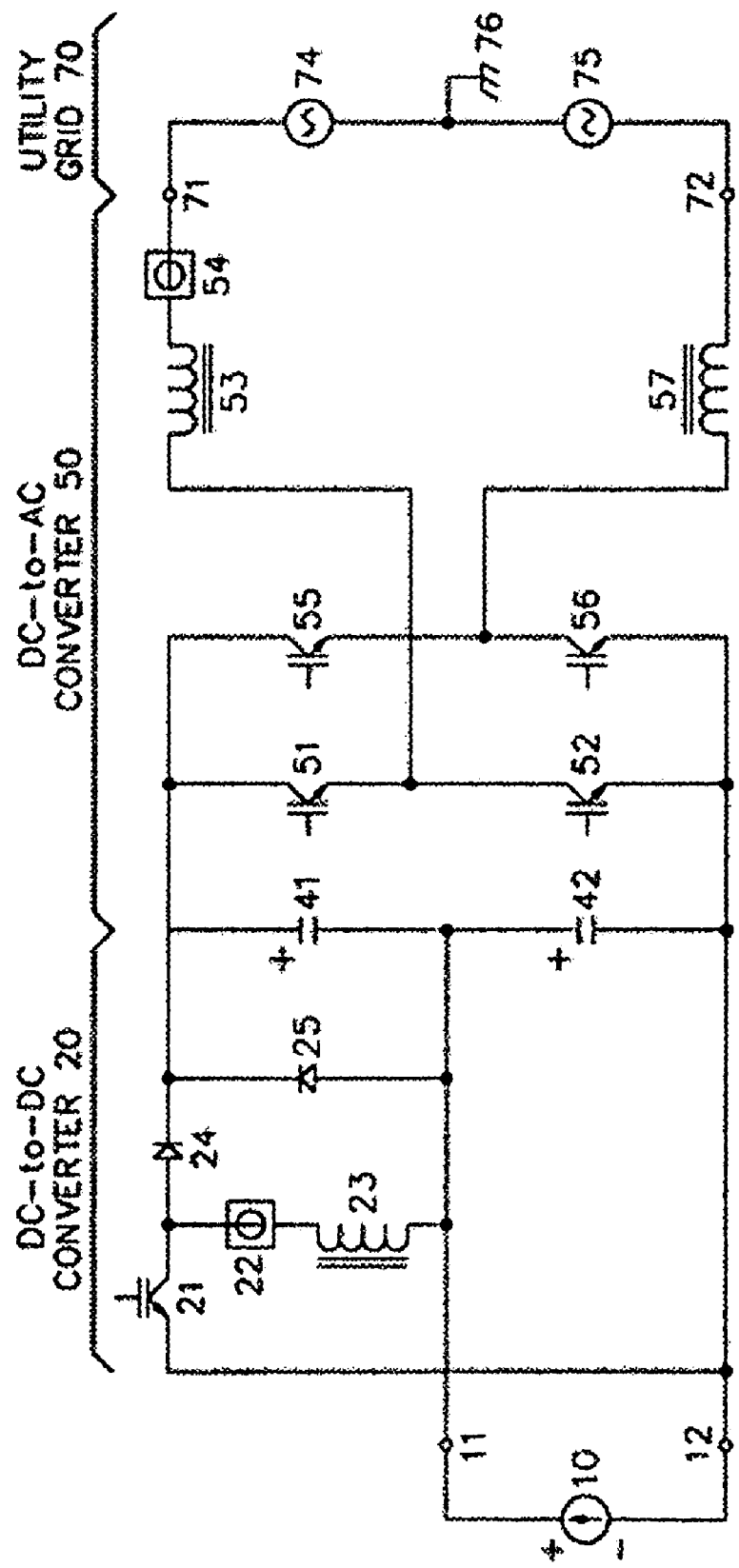
FIG. 3 illustrates an embodiment of the invention with a specific DC-to-DC converter type in a system with an ungrounded PV array and a 120/240 Vac utility grid connection.

FIG. 3 illustrates one possible circuit configuration for DC-to-DC power converter 20 in FIG. 1. Transistor 21, inductor 23 and diode 24 are configured as a typical, non-isolated flyback converter. Current sensor 22 provides feedback to a control circuit. The flyback, DC-to-DC power converter topology and regulation methods thereof are known. Diode 25 is used to bypass capacitor 41 when no additional "makeup" voltage is required at the output of DC-to-DC flyback converter 20.

Figure 4:
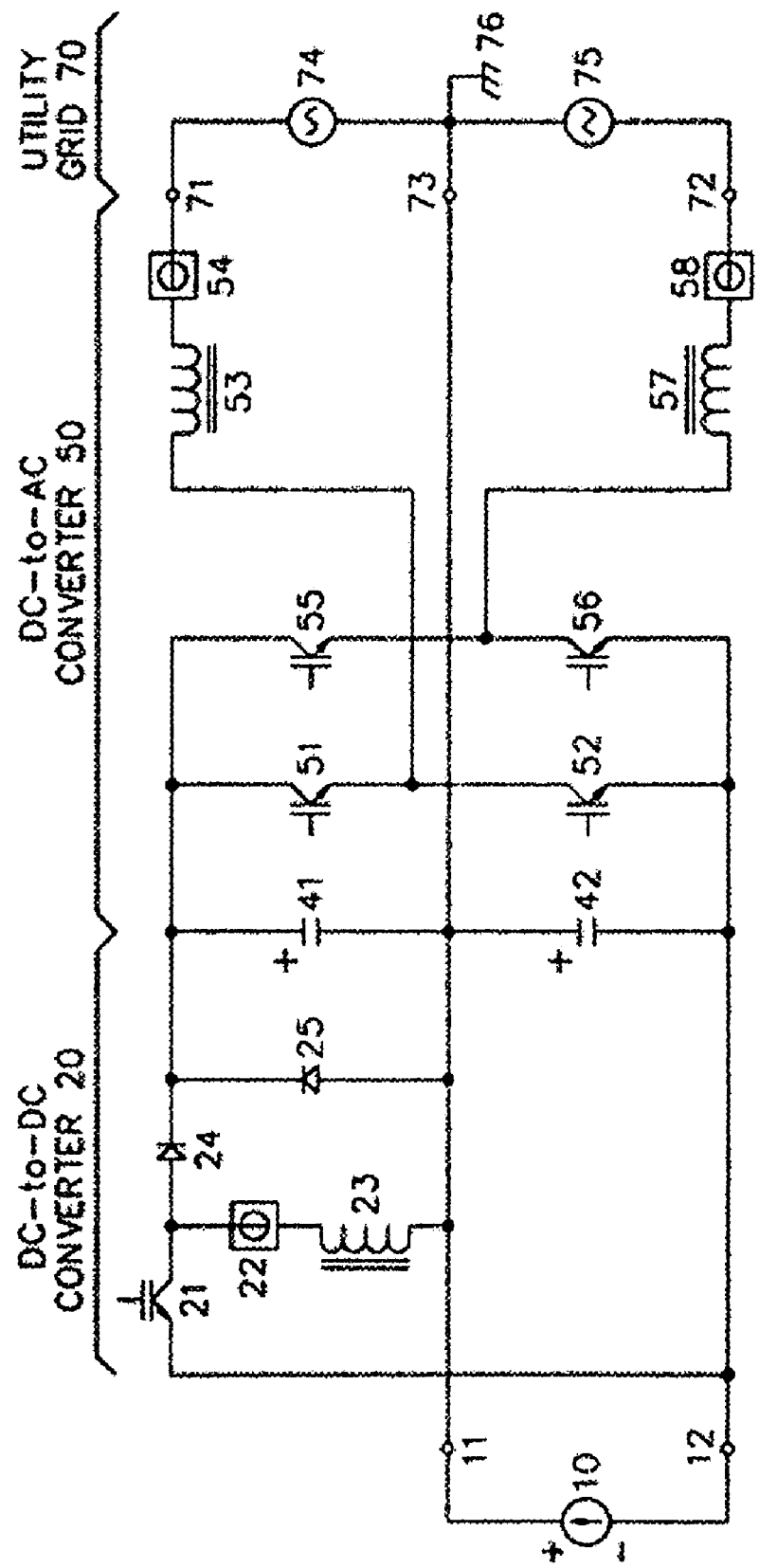
FIG. 4 illustrates an embodiment of the invention as part of a system using an earth-grounded array and a 120/240 Vac utility grid connection.

FIG. 4 illustrates a slightly different version of the topology shown in FIG. 3 where one side of PV array 10 is connected to earth ground 76. The circuit function is the same as in FIG. 3 except that DC-to-DC converter 20 must always supply ½ of the power processed by DC-to-AC converter 50. Also, because the DC supply to DC-to-AC converter 50 is bipolar and the utility grid connection 70 is split-phase, two regulator circuits are required, one for each 120 Vac circuit 72 and 74. As such, additional current sensor 58 is required.

Figure 5:
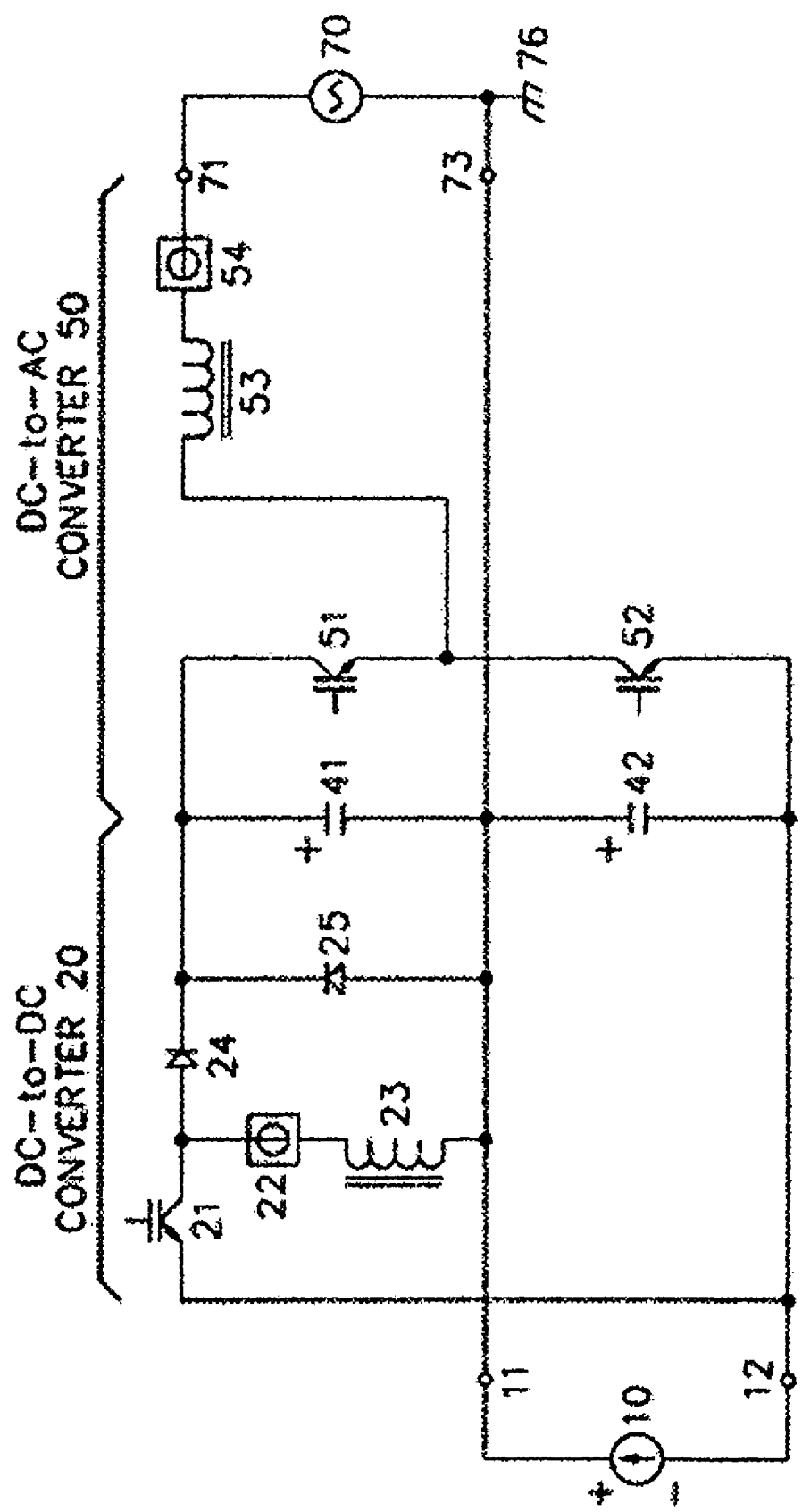
FIG. 5 illustrates an embodiment of the invention as part of a system using an earth-grounded array and a 120 Vac utility grid connection.
Figure 6:
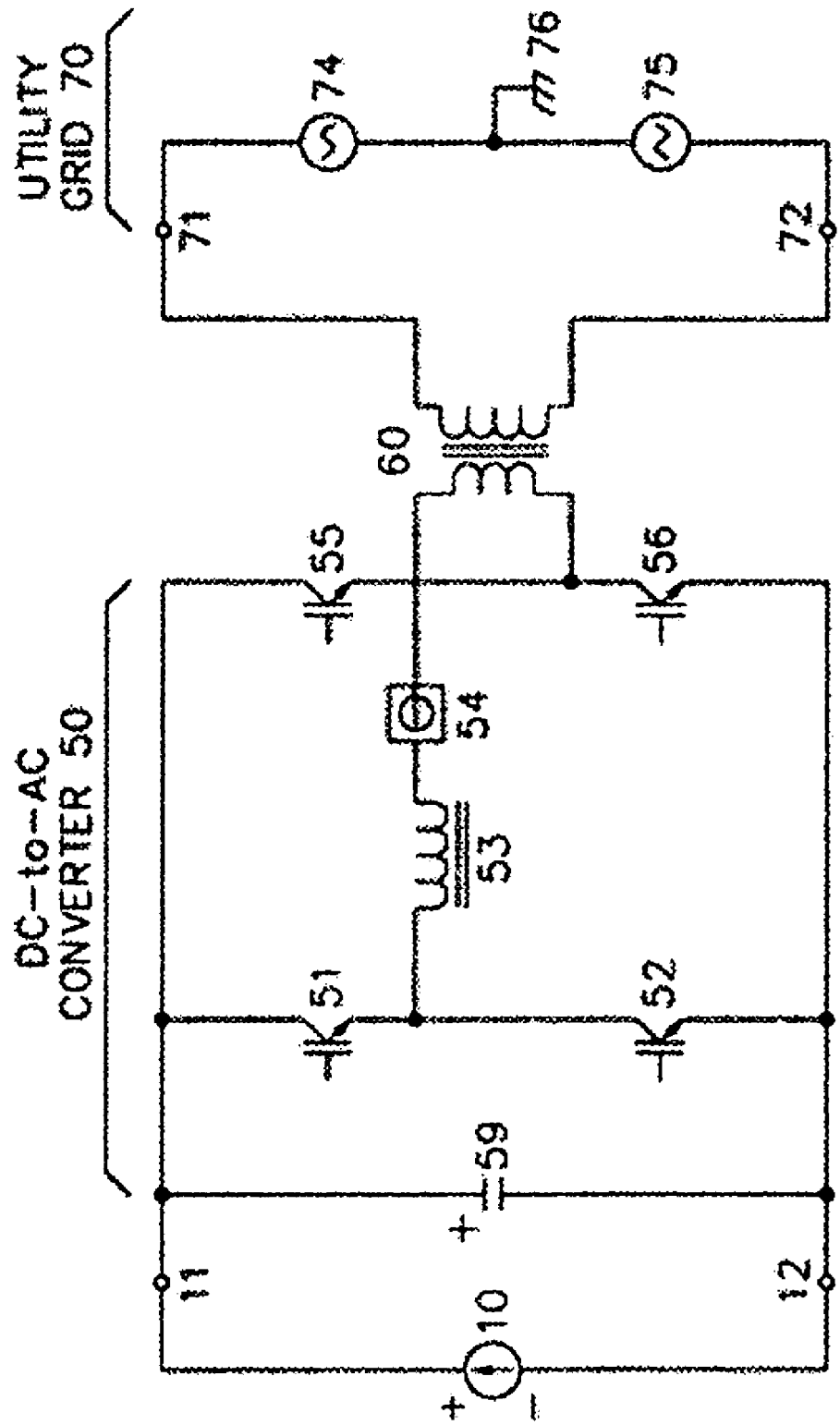
FIG. 6 shows a first common prior art inverter topology.
Figure 7:
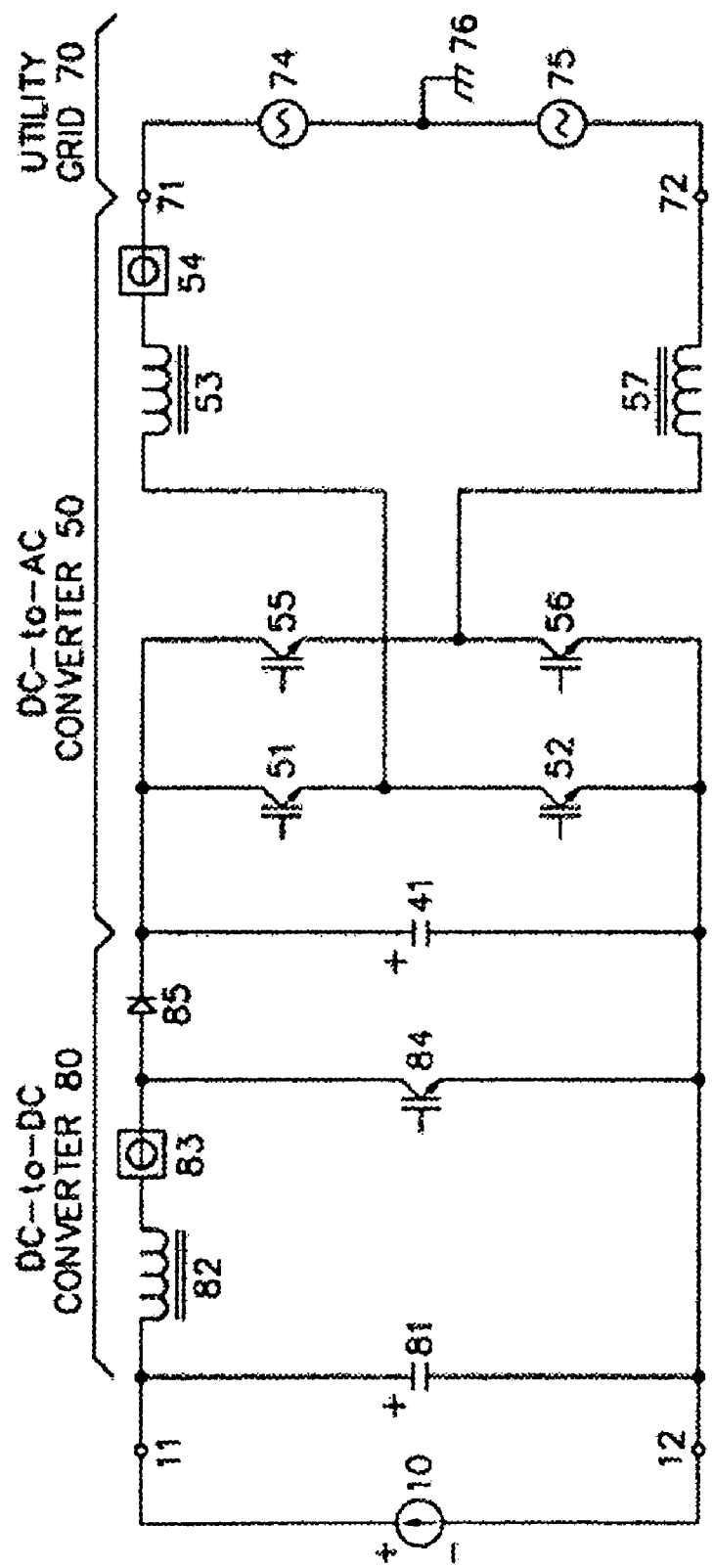
FIG. 7 shows a second common prior art inverter topology.

FIG. 5 is the same as FIG. 4 except that the inverter has one less half-bridge section and supplies power to a single-phase 120 Vac utility grid 70.

The embodiments of this invention are illustrated in the figures using IGBT type semiconductor switching devices. The invention is specific arrangements of switching devices and other components that connect to form novel power circuit topologies based on a central concept. The switching device type does not define the topology. As such, Field Effect Transistors (FETs), Bipolar Junction Transistors (BJTS) or any substantially similar semiconductor switching device type could be substituted for any of the IGBT devices illustrated in FIGS. 1 through 5.

What is claimed is:

1. An electrical power converter apparatus for converting power from a DC source into AC power and comprising; a bipolar energy storage element having bipolar voltages with respect to a common point, a DC-to-DC power converter with inverted input and output voltages with respect to said common point and a DC-to-AC converter, and furthermore, where said DC source is connected across one monopole of said bipolar energy storage element and across the input of said DC-to-DC power converter and where the output of said DC-to-DC power converter is connected to the remaining monopole of said bipolar energy storage element and where said DC-to-AC converter converts the voltages across said bipolar energy storage element into current-regulated sine waves, synchronized with an electrical utility voltage or voltages, and sources power into an electrical utility grid.

2. The apparatus of claim 1, wherein the DC-to-DC power converter comprises a non-isolated flyback converter.

3. The apparatus of claim 2, wherein the non-isolated flyback converter comprises a transistor, inductor and diode.

4. The apparatus of claim 3, wherein the non-isolated flyback converter further comprises a current sensor.

5. The apparatus of claim 1, wherein one side of the DC source is grounded.

6. The apparatus of claim 5, wherein the connection into the electrical utility grid is split-phase, the apparatus further comprising first and second regulator circuits each associated with an AC circuit.

* * * * *